April 22, 1924.
J. H. SHAW
CASEMENT WINDOW ADJUSTER
Filed July 21, 1921
1,491,556
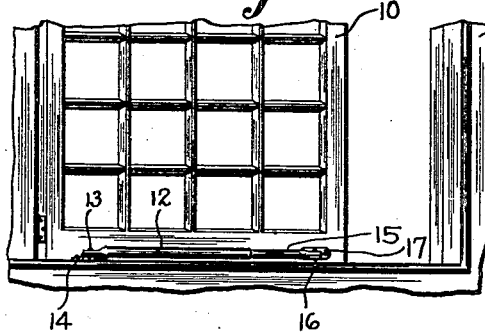
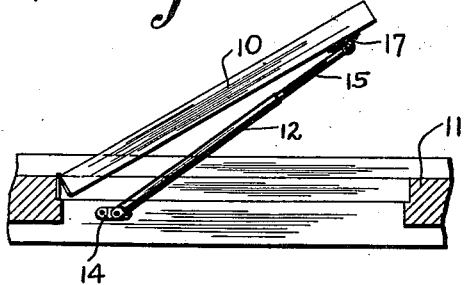
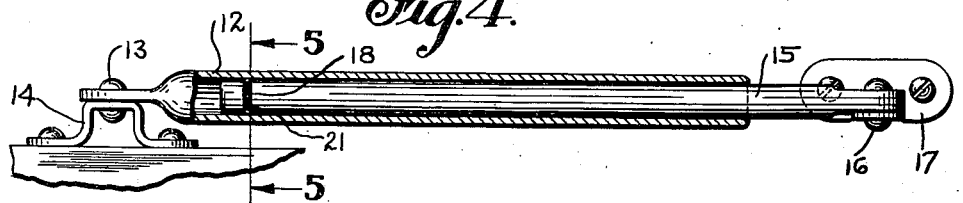
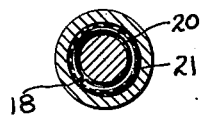
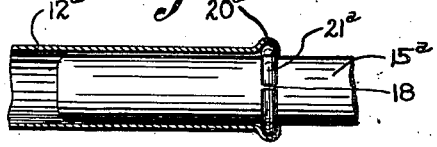
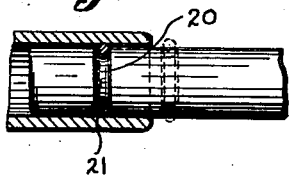
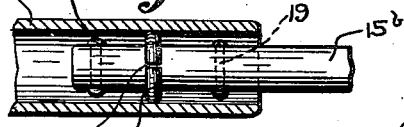
Inventor
John H. Shaw
By Henry E. Rockwell
Attorney Patented Apr. 22, 1924.

1,491,556

UNITED STATES PATENT OFFICE.

JOHN H. SHAW, OF NEW HAVEN, CONNECTICUT, ASSIGNOR TO SARGENT & COMPANY, OF NEW HAVEN, CONNECTICUT.

CASEMENT-WINDOW ADJUSTER.

Application filed July 21, 1921. Serial No. 486,380.

*To all whom it may concern:*

Be it known that I, JOHN H. SHAW, a citizen of the United States, residing in New Haven, county of New Haven, and State of Connecticut, have invented certain new and useful Improvements in Casement-Window Adjusters, of which the following is a full, clear, and exact description.

This invention relates to window adjusters, and more particularly to a device of this type which is adapted to be applied to a swinging window or closure and to hold it automatically in various adjusted open positions. Such devices usually comprise an extensible element comprising two telescoping members, one of which is adapted to be received in the other, and is adapted to be frictionally and yieldingly held against movement therein, so that the window may be moved for the purpose of opening and closing the same when a positive force is applied thereto, but will be held against accidental movement as by the force of the wind.

Manufacturers of these devices have resorted to various expedients to secure the required amount of friction between the two telescoping members in such a manner that the parts will not be so subject to wear that the friction will soon be destroyed by the use of the article and at the same time to produce a simple and relatively inexpensive device for this purpose.

One object of my invention is the provision of an extensible element for a window adjuster which shall be simple in construction and relatively cheap to manufacture.

Another object of my invention is to produce a device of this character which shall have the required amount of friction desirable for such an article, and at the same time obviate any need for adjustment of the parts which might be necessary when the same have been worn by long usage.

A still further object of my invention is the provision of a friction member in such an article of manufacture, which shall be capable of being made of wear resisting material and which will be easy to replace if worn out, although it is not contemplated that such replacement will be necessary in the ordinary use of the article.

To these and other ends the invention consists in the novel features and combinations of parts to be hereinafter described and claimed.

In the accompanying drawings:

Fig. 1 is a front elevational view of a portion of a window having an adjuster embodying my improvements applied thereto;

Fig. 2 is a top plan view of the parts shown in Fig. 1;

Fig. 3 is an enlarged fragmentary view of a window having an adjuster applied thereto, the window being shown in closed position;

Fig. 4 is a sectional view on line 4—4 of Fig. 3;

Fig. 5 is a sectional view on line 5—5 of Fig. 4;

Fig. 6 is an enlarged detail longitudinal sectional view of a portion of the window adjuster;

Fig. 7 is a fragmentary sectional view similar to Fig. 6, showing a modified form of my device; and Fig. 8 is a view similar to Fig. 7 showing a further modification.

In the embodiment of my invention which I have selected for illustration, I have shown a window 10 hinged to a suitable frame 11. While I have shown an adjuster embodying my improvements applied to a casement window at the lower part thereof, it is obvious that the principles of my invention may have other and various applications. My adjuster includes an extensible element comprising two members mounted for telescopic movement relatively to each other. One of these members comprises a tube or socket 12 pivoted at 13 to a bracket 14 mounted upon the window frame. The other member of the pair is in this instance exemplified by the rod 15 pivoted at 16 to a bracket 17 mounted upon the window. It is, of course, obvious that this arrangement may be reversed and the rod mounted upon the frame and the tube upon the window, if desired.

In order to secure the required frictional and yielding engagement between these two telescoping members, so that the window will be retained in adjusted positions and yet be movable when a force is positively applied thereto, I have arranged a friction ring which shall be mounted in such a manner as to frictionally engage the opposing surfaces of the rod and tube. This ring may be mounted to perform this function in a variety of ways, some of which I have shown in the various figures of the drawings. In the preferred form I propose to provide the rod 15 with an annular recess 20 in which is mounted the friction ring 21. While this friction ring may be a solid member just large enough to fit closely within the tube 12 and may also be secured to the rod 15, I propose to provide a split ring which is mounted loosely upon the rod within the recess 20. As shown in Fig. 5, the ends of this ring are slightly spaced at 18 and the ring is preferably made of material which is somewhat resilient so that its exterior diameter will normally be slightly larger than that of the interior of the tube, but when forced within the tube the ring will be slightly compressed, thus forcing the ends closer together and the resilience thereof will cause it to tightly engage the wall of the tube. This is clearly shown in Fig. 6 wherein the position of the ring before its insertion into the tube is shown in dotted lines.

The ring may preferably be made of hard wear-resisting material, and it is obvious that it will contact with the tube about the entire circumference thereof, so that the wear, if any, will be distributed about the circumferences of the tube and ring. With this construction it will practically never be necessary to renew the ring or any of the parts, and the desired frictional engagement of the telescoping members will always be maintained.

In Fig. 7, I have shown a modified form of my device wherein the tube 12ª is provided with an annular recess 20ª adjacent the end thereof by being spun loosely over a split ring 21ª similar to the ring 21. In this form of my invention the annular recess is omitted from the rod 15ª and the rod slides with a frictional engagement within the ring 21ª, which is loosely mounted within the recess in the tube 12ª. In this instance the ring is formed so that normally its interior diameter is slightly smaller than the diameter of the rod 15ª, so that when the rod is inserted in the tube, the ring will be slightly spread and its resilience will cause it to tightly engage the rod.

In Fig. 8, I have shown a still further modification of my invention in which the rod 15ᵇ is made considerably smaller than the tube 12ᵇ and the annular recess is again omitted from this rod. In this form a split ring 21ᵇ is loosely mounted upon the rod 15ᵇ and confined in its movements thereon by the rivets or pins 19. In this instance the ring may be made either so that its interior diameter is slightly smaller than the diameter of the rod or may be formed so that its exterior diameter will normally be slightly larger than the interior diameter of the tube. In either case when the ring is placed upon the rod and the rod is inserted into the tube, the ring will be tightly engaged between the tube and rod so that the required frictional engagement will be secured to prevent any accidental movement of the parts.

While I have stated in some instances that the ring is engaged between the tube and the rod, it will be understood that as the ring is carried by one of these members and moves relatively to the other, it will only be necessary for it to tightly engage the one relatively to which it moves. For instance, in the form shown in Fig. 7, where the ring is carried by the tube, it may engage the rod entirely by the resilience thereof and not from any pressure exerted on the expanding ring by the tube. Likewise, in the modifications shown in Figs. 6 and 8, the ring may at all times be loose upon the rod and forced into engagement with the tube merely by the resilience of the material from which it is made.

While I have illustrated and described some preferred forms of my invention, it is to be understood that the same is not limited thereto in all of its details, but is capable of many modifications and variations which lie within the spirit of the invention and within the scope of the appended claims.

What I claim is:

1. In a window adjuster, an extensible element comprising a pair of telescoping members, and a friction ring of wear resisting material carried by one of said members and tensioned to expand into engagement with the other thereof.

2. In a window adjuster, an extensible element comprising a pair of telescoping members, and a friction ring of wear resisting material mounted between the opposing surfaces of said members and tensioned to automatically expand into frictional engagement with one thereof.

3. In a window adjuster, an extensible element comprising a pair of telescoping members, and a split friction ring loosely mounted between the opposing surfaces of said members and tensioned to expand into frictional engagement with one thereon, and means to limit longitudinal movement of said ring with respect to the other member.

4. In a window adjuster, an extensible element comprising a pair of telescoping members, one of said members provided with a recess, a friction ring loosely mounted in said recess and held against displacement by the wall thereof, said friction member being tensioned to engage the other of said telescoping members.

5. In a window adjuster, an extensible element comprising a pair of telescoping members, one of said members having an annular recess facing the other member and an annulus mounted in said recess and frictionally engaging the other member.

6. In a window adjuster, an extensible element comprising a pair of telescoping members, one of said members having an annular recess facing the other member and an annulus of wear resisting material loosely mounted in said recess and frictionally engaging the other member.

7. In a window adjuster, an extensible element comprising a tube, and a rod adapted to be telescopically received therein, said rod having an annular recess formed therein and a friction ring loosely mounted in said recess and frictionally engaging the wall of the tube.

8. In a window adjuster, an extensible element comprising a pair of telescoping members and a split friction ring loosely mounted upon one thereof and tensioned to frictionally engage the other.

9. In a window adjuster, an extensible element comprising a pair of telescoping members and a split friction annulus loosely mounted upon one thereof and adapted to frictionally engage the other, said annulus being formed of resilient material and adapted to normally present a surface slightly larger than the surface engaged thereby.

10. In a window adjuster, an extensible element comprising a tube, and a rod adapted to be telescopically received therein, said rod having an annular recess formed therein and a resilient split friction ring mounted in said recess, the outer diameter of said ring being normally larger than the inner diameter of the tube.

In witness whereof, I have hereunto set my hand this 7th day of July, 1921.

JOHN H. SHAW.